UNITED STATES PATENT OFFICE.

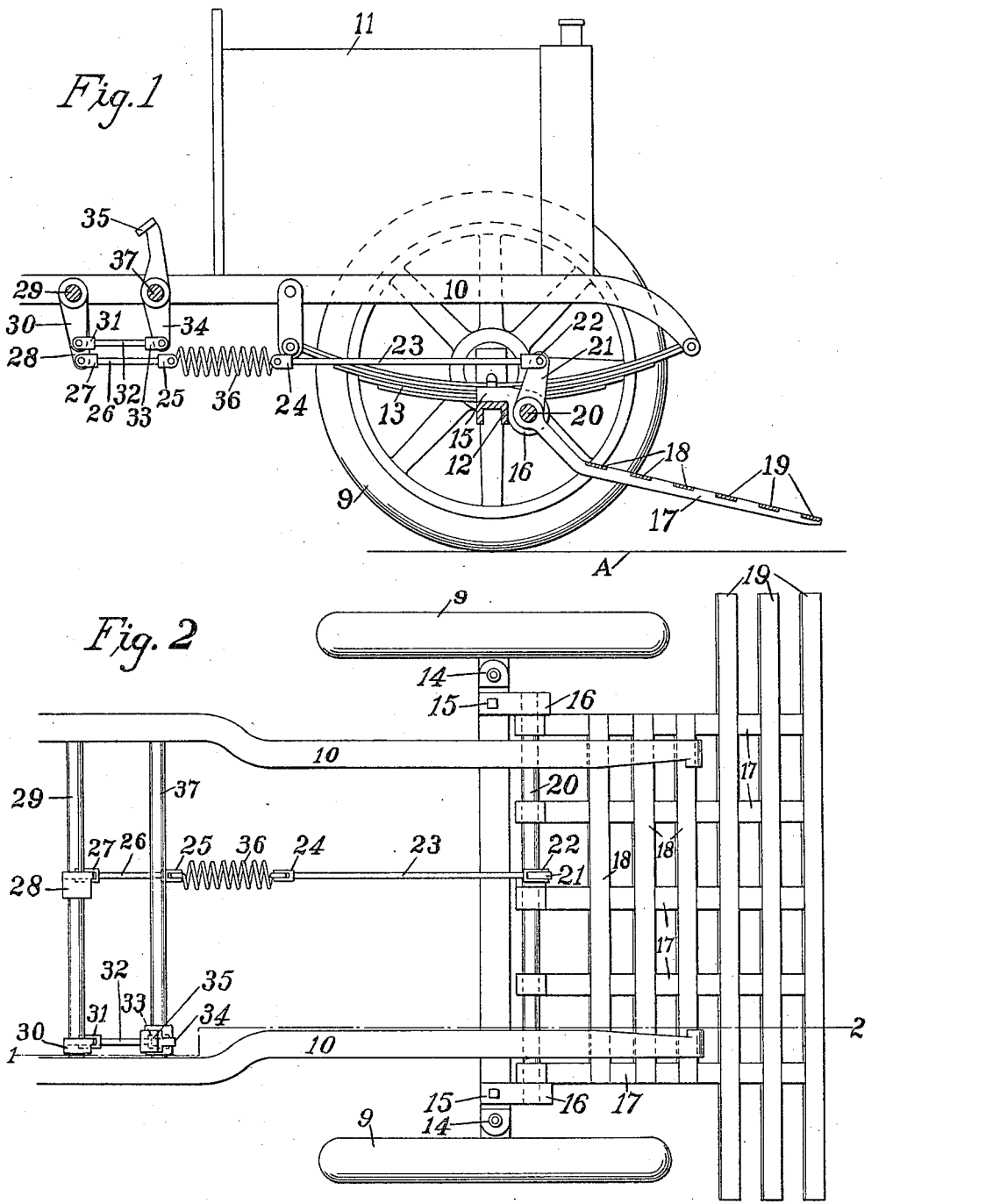

JOHN HEIDI, OF ST. LOUIS, MISSOURI.

AUTOMOBILE-FENDER.

1,146,621.

Specification of Letters Patent.

Patented July 13, 1915.

Application filed February 26, 1915. Serial No. 10,836.

*To all whom it may concern:*

Be it known that I, JOHN HEIDI, a subject of the King of Hungary, but having declared my intention to become a citizen of the United States, and residing at St. Louis, in the State of Missouri, have invented a certain new and useful Improvement in Automobile-Fenders, of which the following is a specification.

This invention relates to fenders, and more particularly, to automobile fenders.

In automobile fenders as heretofore constructed, the fender frame is normally held in raised position and is dropped by the driver by depressing a pedal. Such a construction is not safe for the reason that in case of accidents the driver or chauffeur usually becomes confused so that he cannot find the pedal quickly enough to drop the fender, or the time is too short to accomplish that purpose.

One of the objects of this invention, therefore, is to construct an automobile fender in which the fender frame is normally held in depressed position, but may be held in raised position by the driver and the fender be dropped by a releasing action.

Another object is to provide a fender in which the fender frame will be depressed upon engaging an obstruction irrespective of whether the driver releases the same or not.

Further objects will appear from the detail description taken in connection with the accompanying drawing, in which:

Figure 1 is a side elevation, partly in section, of an automobile chassis provided with a fender illustrating this invention, and, Fig. 2 is a plan of Fig. 1, but with the hood removed.

Referring to the accompanying drawing, 10 designates the side frames of the chassis, 11 the hood, 12 the front axle, 13 the springs, and 14 the wheel knuckles supporting the front wheels 9. These parts may be of the usual construction.

The front axle has bolted thereto a pair of brackets 15 having perforated eyes 16. A fender frame comprising forwardly extending members 17 and slats 18 and 19 fixed to a rock shaft 20, which is mounted to rock in the eyes 16 of the brackets 15. The rock shaft has fixed thereto an arm 21 which is connected to the eye 22 of a link 23 having an eye 24 connected to one end of a spring 36, which is in turn connected to an eye 25 of a link 26, having an eye 27 connected to a lever 28 on a rock shaft 29, mounted to rock in the side members 10 of the chassis. The rock shaft 29 has an arm 30 fixed thereto, which is connected to an eye 31 of a link 32, having an eye 33 connected to a pedal 34 mounted on a rock shaft 37 in the side members 10, and having a foot piece 35. In practice the pedal 34 is arranged beside the clutch pedal, and preferably contiguous thereto, so that the clutch pedal will be engaged by one foot while the pedal 34 will be engaged by the other foot.

When the pedal 34 is released, the fender frame will be depressed and held close to the roadway A, and this is the normal position of the fender frame. To raise the fender frame, the driver places his foot on the pedal, and the fender remains raised until the pedal is released. As soon, however, as the foot is released from the pedal, the fender will be dropped with its forward end close to the roadway.

The driver, when running the automobile, will place his foot on the pedal 34 so as to hold the fender in raised position, as shown in Fig. 1. When, however, there is danger of running over a pedestrian, the driver will release the pedal and thereby permit the fender frame to drop. If the driver should neglect to drop the fender frame, and the front end of this frame should strike the object, such as a pedestrian, the yielding connection between the frame and the pedal will give so as to drop the frame and thus avoid accident, the tension of the spring 36 being suitable for that purpose. It will, therefore, be seen that the invention accomplishes its objects. Since the fender is held in raised position by the driver, the dropping of the fender in case of accident is more certain than if the driver had to depress the frame. The release is a natural movement, even in case of confusion. It will thus be positively assured that the fender frame will be dropped. Moreover, the yielding connection between the fender frame and the pedal provides means whereby the fender frame is dropped, even if the driver should neglect to do so.

It is obvious that various changes may be made in the details of construction without departing from the spirit of this invention. It is, therefore, to be understood that this invention is not to be limited to the specific construction shown and described.

Having thus described the invention, what is claimed is:

1. An automobile fender comprising a fender frame, means for supporting said frame on an automobile for movement toward and from the roadway, means engaged by the driver to hold said frame normally in raised position and adapted when released to permit the frame to drop to depressed position, and means whereby an obstruction will automatically depress said frame, upon engagement therewith, below said normal position.

2. An automobile fender comprising a fender frame, means for supporting said frame on an automobile for movement toward and from the roadway, said frame being normally in depressed position, means engaged by the driver to hold said frame in raised position, and a yielding connection between said frame and said holding means.

3. An automobile fender comprising a fender frame, means for supporting said frame on an automobile for movement toward and from the roadway, said frame being normally in depressed position, a pedal for holding said frame in raised position, and a spring between said pedal and said frame.

In testimony whereof, I affix my signature in the presence of these two witnesses.

JOHN HEIDI.

Witnesses:
J. H. BRUNINGA,
GEORGE S. TOURVILLE.

Copies of this patent may be obtained for five cents each, by addressing the "Commissioner of Patents, Washington, D. C."